Nov. 3, 1959  E. P. LARSH  2,910,877
VARIABLE SPEED POWER TRANSMISSION UNIT
Filed April 29, 1957  2 Sheets-Sheet 1
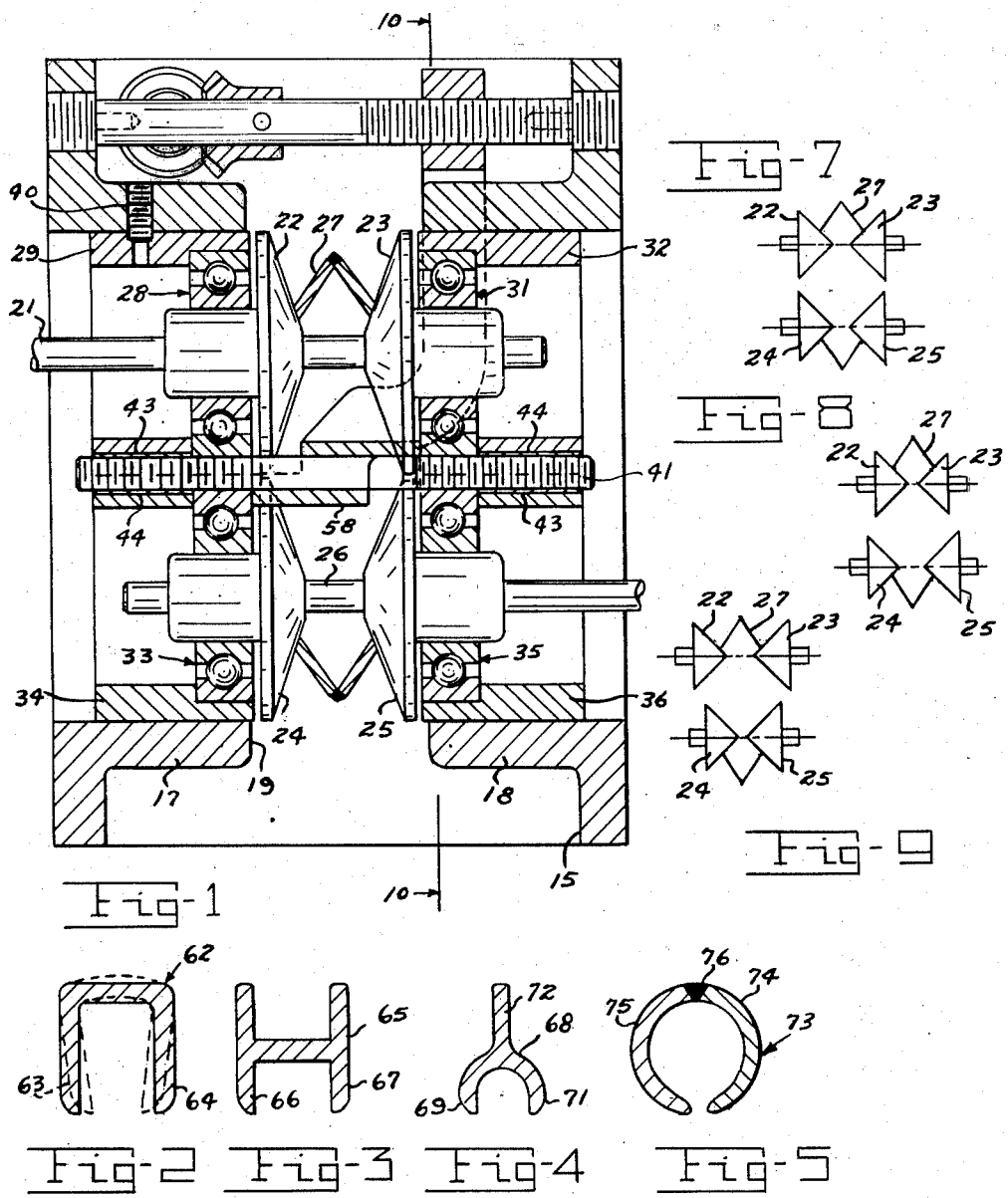
INVENTOR.
EVERETT P. LARSH
BY
Tom Walker
ATTORNEY Nov. 3, 1959 E. P. LARSH 2,910,877
VARIABLE SPEED POWER TRANSMISSION UNIT
Filed April 29, 1957 2 Sheets-Sheet 2
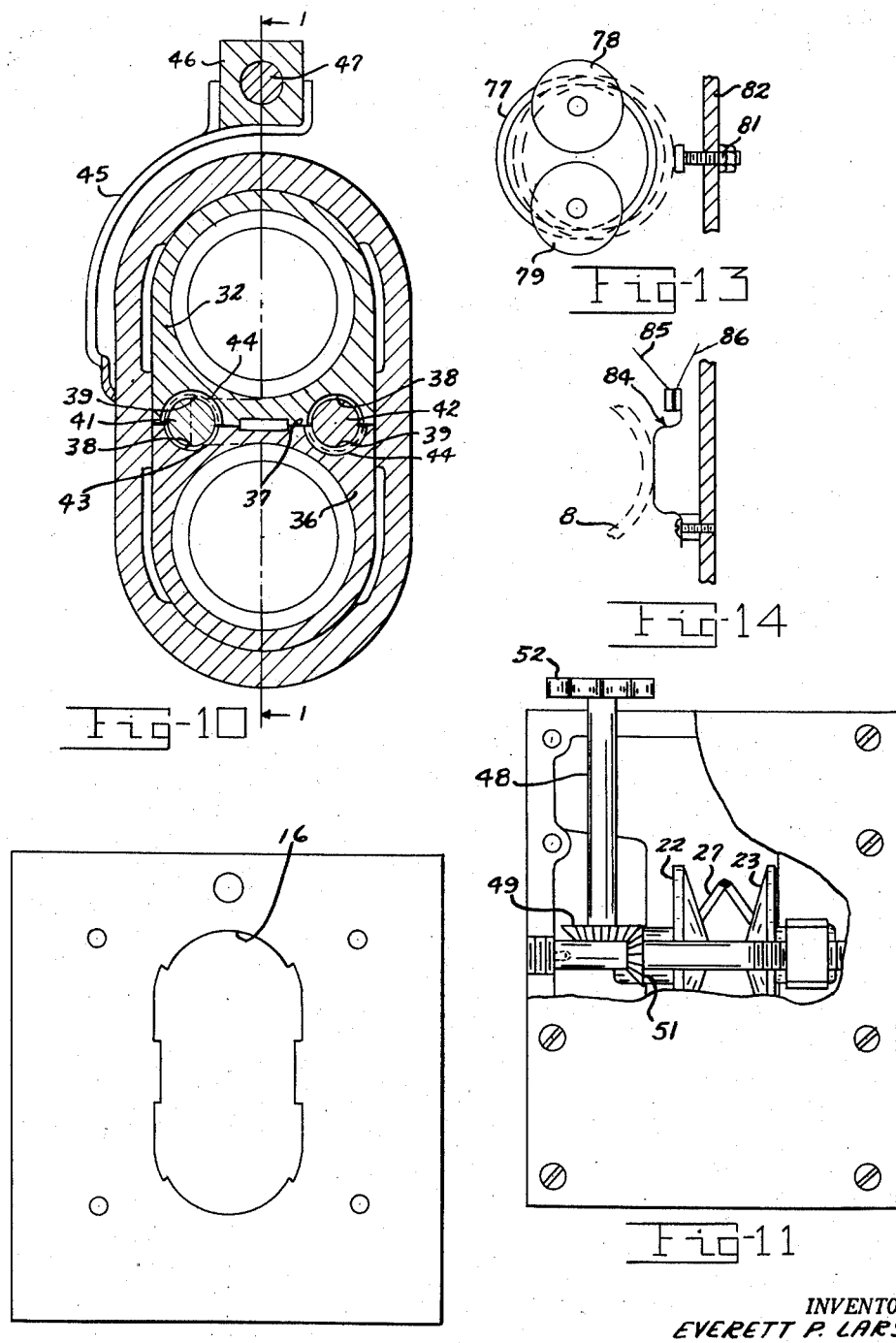
INVENTOR.
EVERETT P. LARSH
BY Tom Walker
ATTORNEY

United States Patent Office 2,910,877
Patented Nov. 3, 1959

2,910,877

VARIABLE SPEED POWER TRANSMISSION UNIT

Everett P. Larsh, Vandalia, Ohio, assignor, by mesne assignments, to The Reliance Electric and Engineering Company, Cleveland, Ohio, a corporation of Ohio Application April 29, 1957, Serial No. 655,797

19 Claims. (Cl. 74—193)

This invention relates to improvements in variable speed transmissions, and particularly to speed change mechanism of the kind in which a first set of cone pulleys is mounted on a driving shaft and a second set on a driven shaft while a substantially inflexible ring is mounted on the cone pulleys and by virtue of its frictional engagement transmits the motion of the driving shaft to the driven shaft.

In motion transmission units of the type described, certain of the cone pulley elements are made relatively adjustable in order that the connecting ring may be moved eccentrically and so vary the speed of rotation of the driven shaft in relation of the speed of rotation of the driving shaft. Further, in its use the unit develops severe strains and stresses and these, together with temperature change and other effects may make for inconsistent results in the adjustment of the cone elements to obtain different speeds, and further may result in a relative slipping of the ring or a wedging thereof between the cone elements. It has been known heretofore to construct the motion transmission unit so that the stresses and strains of operation are sustained by the case or housing therefor. Also, means are known for the applying of a continuous resilient pressure in the direction of removing slack in the unit resulting from rising temperatures. The constructing of the case or housing to sustain operational stresses involves the use of a relatively massive housing structure, however, and creates problems of access and assembly. Also, while it has been known to take up developing slack in the unit, the means heretofore provided for this purpose does not relieve when the unit cools, or when the distance between the cone pulleys is reduced for some other reason, with the result that wedging of the ring upon the cone pulleys not infrequently occurs.

The object of the invention is to simplify the construction as well as the means and mode of operation of variable speed power transmission units, whereby such units may not only be economically manufactured, but will be more efficient and satisfactory in use, adaptable to a wide variety of applications, and be unlikely to get out of order.

A further object of the instant invention is to make the motion transmitting unit of a balanced construction wherein operational strains and stresses are largely sustained within the unit itself, thus obviating the need for a relatively heavy case or housing, as well as the need for complex machining of the housing to accommodate the unit.

Another object of the invention is to provide means, operative to take up developing slack in the unit, which is effective also to relieve predetermined amounts of pressure between opposing cones.

A further object of the invention is to provide means for easy and accurate setting of the relative positions of the cone pulleys and the ring.

A still further object of the invention is to provide new means for interconnecting the bushings for movement to adjust the cone pulleys for speed change, such means lending itself readily to a connecting of the normally stationary cone pulleys whereby to relieve the stresses in the housing.

Still another object of the invention is to avoid damage to the ring and cone pulleys as may result from slipping and wedging actions of the ring relatively to the cone pulleys.

A still further object of the invention is to introduce a generally new concept of a ring in devices of the kind described according to which the ring is constructed for limited flexibility in longitudinal sense, whereby upon pre-setting or pre-stressing thereof the ring may exert a continuous resilient force to take up slack developing in the unit, and further whereby the ring may yield to relative approaching motions of the cone pulleys which tend to wedge the ring upon the cones when the ring is longitudinally inflexible.

Still another object of the invention is to present a generally new ring in a motion transmitting unit of the kind described which is more simple and cheaper to construct than rings heretofore used for the same purpose and which offers new and unexpected advantages over such rings of the prior art.

A further object of the invention is to provide a variable speed power transmission unit possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in longitudinal section of a motion transmitting unit in accordance with the illustrated embodiment of the invention, shown installed in a case or housing therefor;

Fig. 2 is a detail view in cross section of one form of connecting ring;

Fig. 3 is a view like Fig. 2, showing another form of connecting ring;

Fig. 4 is a view like Figs. 2 and 3 showing still another form of connecting ring;

Fig. 5 is a view like Figs. 2, 3 and 4 showing a further form of connecting ring;

Fig. 6 is a view like Figs. 2, 3, 4, and 5 showing that form of connecting ring show in Fig. 1;

Fig. 7 is a detail diagrammatic view of the cone and ring assembly, showing one position of the ring upon the cone pulleys;

Fig. 8 is a view like Fig. 7, wherein certain of the cone pulleys have been adjusted to change the relative position of the connecting ring in an eccentric sense and thereby to change the ratio of movement between the driving and driven shafts;

Fig. 9 is a view like Figs. 7 and 8, showing the connecting ring shifted in a direction opposite to that shown in Fig. 8 with the ratio of movement between the driving and driven shafts being correspondingly changed in the opposite direction;

Fig. 10 is a view in cross section, taken substantially along the line 10—10 of Fig. 1, some details of the housing being omitted;

Fig. 11 is a top plan view of the device a shown in

Fig. 1, a part of the housing being broken away in order fully to show the cone adjusting means;

Fig. 12 is a detail view in front elevation of the case or housing;

Fig. 13 is a detail view, partly diagrammatic, showing a positive stop for limiting lateral adjustment of the connecting ring in one direction; and Fig. 14 is a view like Fig. 13 showing means utilizing lateral motion of a predetermined amount in one direction to open a switch in an electrical circuit.

Like parts are indicated by similar characters of reference throughout the several views.

Referring to the drawings, a variable speed transmission device in accordance with the illustrated embodiment of the invention, includes a case 15. Unlike similar devices of the prior art, the case of the present device is not required to sustain material stresses and strains created in the operation of the device. It serves as a casing or housing for the transmission unit proper, and as a reactant means for the mechanism by which the transmission unit is adjusted to operate at different speeds. The case 15 may thus be relatively light weight in its construction, as well as being made relatively open for easy accessibility to the interior thereof. Further, in accordance with the present invention, the need for costly boring and counter-boring of the case to close tolerances is avoided.

The present case 15 supports the speed transmission unit in a single opening 16 thereof (Fig. 12) formed in aligned inwardly extending bosses 17 and 18 in the case. The latter terminate short of contact with one another, being separated by a transverse space 19.

Considering the structure of the transmission unit, a driving shaft 21 enters the case 15 through one end of the opening 16. The shaft 21 passes through the space 19 and has mounted thereon within such space, a set of longitudinally spaced apart cone pulleys 22 and 23. The latter are keyed or otherwise connected to the shaft 21 for unison rotary and relative longitudinal motion. In laterally spaced apart, normally aligned relation to the cone pulleys 22 and 23 is another set of cone pulleys 24 and 25 mounted on a shaft 26 for unison rotary and relative longitudinal motions. The shaft 26 extends longitudinally through the space 19 and out of the case 15 by way of the opposite end of the opening 16, and functions or serves as the driven shaft. Motion is transmitted from the shaft 21 to the shaft 26 through the sets of cone pulleys 22—23 and 24—25, and more particularly by a relatively radially inflexible ring 27 which encircles the shafts within the space 19 and which is in common bridging engagement with the sets of cone pulleys. In accordance with the known form of operation of devices of this class, the ring 27 establishes a frictional driving relationship between the set of cone pulleys 22—23 and the set of cone pulleys 24—25, with the speed ratio being variable by relative axial adjustment of certain of the cone pulleys whereby an eccentric readjustment of the ring 27 in a lateral sense is achieved.

The cone pulley 22 has a rotary mounting in a bearing 28 mounted in a bushing 29. The cone pulley 23 rotates in a bearing 31 installed in a bushing 32. The cone pulley 24 is mounted in a bearing 33 in a bushing 34, and, finally, the cone pulley 25 rotates in a bearing 35 in a bushing 36. The several defined bushings may be identically constructed and according to a feature of the present invention may be inexpensively produced, as through a form of powder metallurgy. Each is formed on one part of its periphery with an elongated flat surface and over the remainder of its periphery conforms substantially in shape to the configuration of the opening 16 in the case 15 above and below the medial horizontal plane of such opening. The bushings may be considered as being arranged in inverted pairs, the bushing 29 and the bushing 34 constituting one pair and the bushing 32 and the bushing 36, constituting the other pair. Thus, each pair is in what may be considered a back to back relation, with the respective flat surfaces 37 thereof in contacting relation in the medial horizontal plane of the opening 16 and with the bushing bodies proper extending to opposite sides of such plane being received with a relatively close fit within the walls of the opening. The bushings 29 and 34 and the pair of bushings 32 and 36 are mounted in respective bosses 17 and 18 in this manner and through their respective bearings support the cone pulleys in laterally spaced apart sets as described before.

The bushings for the cone pulleys are interconnected in a manner to balance torsional and other forces and in a manner to facilitate relative adjustment to vary the speed ratio. Thus, in the surface 37 of each bushing is a pair of laterally spaced apart longitudinal, half-round recesses 38 and 39. Assembly of the bushings in inverted pairs as described results in recesses 38 and 39 of opposing bushings being aligned whereby to form circular openings extending longitudinally through the assembled pair of bushings in the medial horizontal plane thereof. These openings receive respective bolts 41 and 42, each in a predetermined interfitting relationship with the bushings through half-round sleeves 43 and 44 installed respectively in the recesses 38 and 39. Thus, the surface of the bolts 41 and 42 are threaded in the region in which they pass through the bushings and these threaded surfaces achieve a cooperative relation with the half-round sleeves 44 which are internally threaded in a manner complementary to the threads on the bolts. The sleeves 43 are unthreaded and have no cooperative engagement with the bolts, which are free to slide relatively thereto in a longitudinal sense. The bushings of the pair 29 and 34 are in inverted relation to one another and in an opposing relation to the pair of bushings 32 and 36. The openings defined by the half-round recesses 38 and 39 in the bushings accordingly are aligned with one another and the bolts 41 and 42 are common to the oppositely disposed pairs of bushings. Further, since the separate pairs of bushings are in opposed relation the sleeves 43 and 44 therein occupy reverse positions. Accordingly, when a bolt 41 or a bolt 42 is installed between the pairs of bushings and threaded into engagement with the sleeves 44 therein it achieves a threaded engagement with a bushing associated with one set of cone pulleys 22—23 and with a bushing associated with the other set of cone pulleys 24—25. The other bolt similarly interconnects the other bushings of the sets of cone pulleys. In the illustrated instance, the bolt 41 interconnects the bushing 32 and the bushing 34 while the bolt 42 interconnects the bushing 29 and the bushing 36. It will be understood in this regard that the bushings are interconnected for unison longitudinal movement.

To effect adjustment of the device for varying the speed ratio, there is provided a bracket 45 which at its one end is secured to a nut 46 having a threaded mounting on a stud 47 mounted for relative rotary motion in upstanding walls of the case 15. A shaft 48 likewise is mounted in the case 15, and in transverse relation to the stud 47. Bevel gears 49 and 51 establish a driving connection between the shaft 48 and the stud 47, and the former is accessible for manual rotation from outside the case and has a knob 52 thereon to facilitate such adjustment. Rotation of the shaft 48, it will be apparent, similarly rotates the threaded stud 47 and effects an axial motion of the nut 46 therealong. The bracket 45 is thus compelled similarly to move within the case. The bracket extends in partly surrounding relation to the boss 18 and projects into the space 19 where it is formed with a curved portion 53 looped about the bolt 41 and making contact at its opposite ends respectively with the bushing 32 and with the bushing 34. The result of a bodily shifting movement of the bracket 45 within the case 15, therefore, is to effect a unison longitudinal adjustment of the bushing 32, with its cone pulley 23, and of the bushing 34 with its cone pulley 24. The movements of the cones 23 and 24 are in opposite directions relatively to the other cone of their respective sets. Thus, an approaching motion of the cone 23 toward the cone 22 is accompanied by a simultaneous motion of equal extent of the cone 24 in a relative separating direction with respect to the cone 25. The effect of longitudinal adjustment of the bushings 32 and 34 accordingly is to move the ring 27, which tends to follow the relative separating and approaching motions of the cones, in an eccentric manner. Longitudinal motion of the connected bushing in one direction results in shifting of the ring from the position shown in Fig. 7 in the direction indicated in Fig. 8 wherein the ring is moved more distant from the driving shaft 21 and more closely toward the driven shaft 26. Similarly, motion of the connected bushings in the opposite direction will tend to produce an opposite effect, that is to shift the ring from a position as shown in Fig. 7 toward a position as shown in Fig. 9 wherein the ring is caused more closely to approach the driving shaft 21 and to retract from the driven shaft 26. The bushings 29 and 36 are relatively stationary during the speed adjusting movements of the bushings 32 and 34, and they may be held by set screw 40 against following motion of the adjusted bushings. The bushings 29 and 36 are, however, connected to one another so that the motion transmission unit is essentially an integrated unit within the case 15, and the stresses and strains of operation are absorbed within the unit itself, primarily by the bolts 41 and 42.

Devices of the present class preferably incorporate a resilient means automatically effective to take up slack developing in the unit as a result of temperature rise. According to the present invention this means is comprised in the ring 27 and according to a further feature of the invention the ring is effective also to relieve pressure resulting from a contraction of the parts in response to cooling or from other causes. Slippage of the ring relatively to the cone pulleys and binding of the ring upon the pulleys both are avoided.

To achieve these ends, the ring is made resilient. The ring shown in Fig. 1, and in Fig. 6, is fabricated from annular sheet metal stampings 59 and 61 connected as by welding at their outer ends in a position giving the ring in cross section substantially the shape of an inverted V. The divergent elements 59 and 61 are thus formed as legs separately engageable with respective pairs of cone pulleys. Thus, the leg 61 engages the pulley 22 and the pulley 24 while the leg 59 engages the pulley 23 and the pulley 25. By reason of its construction, the ring is capable of limited flexing about the weld at its outer periphery so that the extremities of the legs 59 and 61 are capable of relative approaching and retracting movements. The ring tends normally to assume the position as shown in Fig. 6 and when installed in the unit the bushings 29, 32, 34 and 36 may be relatively adjusted through the bolts 41 and 42 to apply an initial axially compressive force to the ring, the reactance of such force being utilized to urge the respective sets of cones in a separating direction. Any elongation of the parts resulting from temperature rise accordingly is compensated for by an expansion of the ring to obviate lost motion and to maintain the ring in close interfitting contact with the cone pulleys.

Under the broad concept of a resilient motion transmitting means between the driving and driven sets of cone pulleys, the ring may assume different shapes, as indicated for example in Figs. 2 through 5. In Fig. 2 the ring is in cross section shaped as in inverted U, being a one piece member 62 having spaced apart legs 63 and 64 which tend normally to assume a position relatively parallel to one another but which may be flexed toward a position as indicated in dotted lines therein, from which latter position the legs will attempt to spring back to the parallel position shown in full lines.

In Fig. 3 a ring 65 is shown which in cross section has the shape of a letter H being thus formed with dependent legs 66 and 67 having the characteristics of the legs 63 and 64 of Fig. 2.

In Fig. 4 a ring 68 is shown which is approximately semi-circular in shape to define projecting legs 69 and 71 for springing engagement with the sets of cone pulleys as described. The ring 68 may in its intermediate portion be formed with a radially extending rib 72 for added strength.

In the embodiment of Fig. 5, the ring 73 thereof is, like the embodiment of Fig. 6, formed with separate sheet metal elements 74 and 75 connected as by a weld 76 at their outer peripheries. The elements 74 and 75 are, however, rounded in an accentuated manner to give the ring a substantially cylindrical shape. At their inner peripheries, the elements 74 and 75 are separated from one another, however, so that the ring is in effect split at its inner periphery and the elements 74 and 75 as a result have a springing action in accordance with the teaching of the other rings. As indicated, the several rings may be beveled for broader contact with the surfaces of the cone pulleys.

Wedging of the transmission ring upon the cone pulleys may be precluded by a positive stop, as indicated in Fig. 13. As there shown, a ring 77 interconnects sets of cone pulleys 78 and 79 and is aligned with a screw stud 81 adjustably set in a portion 82 of the case. Eccentric adjustment of the ring in one direction accordingly may be limited by a pre-setting of the stud 81 to any desired maximum extent in a given direction.

The eccentric adjustment of the ring also may be utilized, as indicated in Fig. 14, to open a switch in an electric circuit to discontinue operation of the motion transmitting unit or to perform any other desired function. As there indicated, a ring 83 is positioned to bear upon and to open a switch 84, at some predetermined point in the lateral movement of the ring, whereby to discontinue flow through electrical conductors 85 and 86 within which the switch 84 is interposed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a variable speed transmission of the type comprising spaced pairs of adjustable cones and an interfitting connecting ring in which one cone of each pair is simultaneously adjusted in a corresponding direction to effect variations in speed, a bushing providing an individual mounting for each of said cones, a case having a through opening receiving said bushings, the bushings of each pair of cones being held by each other and by opposing wall portions of said opening against lateral motion in said opening, and means interconnecting said bushings for longitudinal motion of each bushing of a pair in unison with a respective one only of the bushings of the other pair.

2. A transmission according to claim 1, characterized in that said last named means comprises a pair of bolts interposed between the bushings of each pair, one bolt being connected to a bushing of one pair and a bushing of the other pair and the other bolt being connected to the other bushing of said one pair and the other bushing of said other pair.

3. In a variable speed transmission of the type comprising spaced pairs of adjustable cones and an interfitting connecting ring in which one cone of each pair is simultaneously adjusted in a corresponding direction for effecting variations in speed, a bushing providing an individual mounting for each of said cones, the bushings of each pair of cones having adjacent contacting surfaces, a case having an opening receiving the assembly of bushings, said bushings of each pair being held by contact with one another and with the wall of said opening from lateral motion relatively to said case, each pair of bushings having in its said adjacent surfaces mating recesses defining a longitudinal through opening, the through openings in the respective pairs of bushings being aligned, a bolt installed in said openings connecting one of the bushings of one pair with one of the bushings of the other pair, and means for adjusting said interconnected bushings longitudinally in said case.

4. A transmission according to claim 3, characterized by other mating recesses in the adjacent surfaces of each of said bushings defining other aligned through openings, a bolt received in said other aligned openings connecting the other bushing of said one pair with the other bushing of the other pair.

5. A variable speed transmission, including a case having a through opening therein, first and second longtudinally spaced apart pairs of bushings in said opening, the bushings of each pair having parallel contacting surfaces and being held thereby and by contact with the wall of said opening against lateral motion relatively to said case, means connecting one bushing of one pair with one bushing of another pair, means for adjusting said connected bushings longitudinally in said housings, cones rotatably mounted in said bushings, corresponding cones of the respective pairs being in opposed spaced relation to one another, a ring received between said cones, and driving and driven shafts connected to said cones.

6. A variable speed transmission, including a transmission unit comprising laterally spaced apart sets of opposing cones, an interfitting connecting ring, bushings in which said cones are rotatably mounted, and means interconnecting a bushing of one set with a bushing of the other set; a case having an opening receiving said transmission unit, said unit being held by contact of said bushings with one another and with the wall of said opening against lateral motion relatively to said case; and means on said case for longitudinally adjusting in said case said bushing of said one set and said bushing of said other set.

7. A variable speed transmission including a case having an opening therein, a transmission unit received in said opening including a first set of opposed spaced apart cones and in laterally spaced apart relation thereto a second set of opposed spaced apart cones, a bushing for each of said cones, the bushing of each set having a surface abutting a corresponding surface on the corresponding bushing of the other set, said bushing being mounted in said opening in said case, means for adjusting certain of said bushings to increase the spacing between one set of cones while simultaneously reducing the spacing between the cones of the other set, driving and driven shafts connected to respective sets of cones, and a connecting motion transmitting ring in encircling relation to said shafts and in common frictional engagement with said sets of cones, adjustment of said cones as described serving eccentrically to shift said ring.

8. A variable speed transmission according to claim 7, characterized in that said ring has longitudinally spaced apart edges each engaging corresponding cones in different sets of cones, said ring being flexible to take up and to relieve pressure between the sets of cones.

9. A variable speed transmission wherein laterally spaced apart sets of opposing cones have motion transmitted one to another by a ring received between the opposing cones of the sets, characterized in that said ring has longitudinally spaced apart edges each engaging corresponding cones in different sets of cones, said ring being resilient to take up and to relieve pressure between the sets of cones.

10. A variable speed transmission wherein laterally spaced apart sets of opposing cones have motion transmitted one to another by a ring relatively inflexible in a radial sense received between the opposing cones of the sets, characterized in that said ring is formed with an annular recessed portion defining longitudinally spaced apart fingers flexible in a longitudinal sense respectively engaging corresponding pairs of cones in said separate sets.

11. A variable speed transmission according to claim 10, further characterized in that said ring has in cross section substantially the shape of an inverted U, the legs thereof forming said fingers.

12. A variable speed transmission according to claim 10, further characterized in that said ring is formed with spaced apart side walls and an integral cross portion intermediate the peripheral edges of said walls, said edges on one side of said cross portion forming said fingers.

13. A variable speed transmission according to claim 10, characterized in that said ring is in cross section substantially semi-circular in shape with an integral rib on the closed or back side thereof, the edges of the ring at the open or opposite side thereof forming said fingers.

14. A variable speed transmission according to claim 10, further characterized in that said ring has in cross section a substantially cylindrical formation split along the inner periphery thereof to form said fingers.

15. A variable speed transmission wherein laterally spaced apart sets of opposing cones have motion transmitted one to another by a ring in common frictional contact with said sets of cones, certain of said cones being adjustable to shift said ring eccentrically relatively to said sets of cones; characterized by means normally spaced from said ring for limiting eccentric motion of said ring.

16. A variable speed transmission according to claim 15, further characterized in that said last named means is in the form of a stop positively arresting movement of said ring in one direction eccentrically.

17. A variable speed transmission according to claim 15, further characterized in that said last named means is in the form of a control for the speed transmission actuated automatically by said ring in response to an eccentric repositioning thereof of predetermined extent in one direction.

18. In a variable speed transmission of the type comprising spaced pairs of adjustable cones and an interfitting connecting ring in which one cone of each pair is simultaneously adjusted in a corresponding direction for effecting variations in speed, a bushing providing an individual mounting for each of said cones, the bushing of each pair of cones having adjacent contacting surfaces, a case having an opening receiving the assembly of bushings, said bushings of each pair being held by contact with one another and with the wall of said opening from lateral motion relatively to said case, each pair of bushings having in its said adjacent surfaces mating recesses defining a longitudinal through opening, the through openings in the respective pairs of bushings being aligned, a bolt installed in said openings and threaded at its opposite ends, internally threaded half round sleeves installed in opposite ends of said openings to interfit with the threads on the bolt, said sleeves being circumferentially inverted with respect to one another whereby said bolt connects a bushing of one pair with a diametrically opposed bushing of the other pair.

19. A variable speed transmission, including a transmission unit comprising laterally spaced apart sets of opposing cones, an interfitting connecting ring, bushings in which said cones are rotatably mounted, and means interconnecting a bushing of one set with a bushing of the other set; a case having an opening receiving said transmission unit, said unit being held by contact of said bushings with one another and with the wall of said opening against lateral motion relatively to said case; means on said case for longitudinally adjusting in said case said bushing of one set and said bushing of said other set; and detent means to hold the unit from longitudinal motion relatively to the case in response to operation of said last named means.

References Cited in the file of this patent

UNITED STATES PATENTS

| | | |
|---|---|---|
| 1,574,620 | Gill | Feb. 23, 1926 |
| 2,611,276 | Heynau | Sept. 23, 1952 |

FOREIGN PATENTS

| | | |
|---|---|---|
| 1,012,440 | France | Apr. 16, 1952 |
| 736,106 | Germany | June 7, 1943 |
| 472,792 | Italy | June 30, 1952 |